United States Patent [19]

Ishiguro

[11] 4,198,074

[45] Apr. 15, 1980

[54] WORK IMPLEMENT MOUNTING STRUCTURE

[75] Inventor: Toshio Ishiguro, Sakai, Japan

[73] Assignee: Kubota, Ltd., Osaka, Japan

[21] Appl. No.: 935,055

[22] Filed: Aug. 18, 1978

[30] Foreign Application Priority Data

Nov. 29, 1977 [JP] Japan .......................... 52-161064[U]

[51] Int. Cl.² .............................................. B60D 1/00
[52] U.S. Cl. ................................. 280/415 A; 172/123;
172/446; 280/461 A
[58] Field of Search .......... 280/456 A, 456 R, 460 A,
280/460 R, 461, 467, 415 R, 415 A; 172/446,
123, 476, 656, 667, 673, 679, 741

[56] References Cited

U.S. PATENT DOCUMENTS

| | | | |
|---|---|---|---|
| 2,644,694 | 7/1953 | Briscoe | 172/446 X |
| 2,711,036 | 6/1955 | Crenshaw | 172/446 X |
| 3,031,208 | 4/1962 | Abbott | 280/467 X |
| 3,066,952 | 12/1962 | Price | 280/415 A |

FOREIGN PATENT DOCUMENTS 1107986  5/1961  Fed. Rep. of Germany ...... 280/461 A

OTHER PUBLICATIONS

Operator's Manual OM-D3-851, John Deere Co., p. 7, 1956.

Primary Examiner—John A. Pekar
Attorney, Agent, or Firm—Edwin E. Greigg

[57] ABSTRACT

A structure for mounting a work implement on a tractor in which each of the right and left coupling means may be attached to the work implement in two alternative transversely reversed positions. This arrangement provides positional adjustment of the work implement in the transverse direction.

4 Claims, 4 Drawing Figures

WORK IMPLEMENT MOUNTING STRUCTURE

BACKGROUND OF THE INVENTION

1. Field of the Invention

This invention relates to a work implement mounting structure in which a pair of right and left coupling means are connected to a pair of right and left links extending from a tractor.

2. Description of the Prior Art

The known art of transversely changing and adjusting the mounting position of a work implement relative to the tractor includes an arrangement in which coupling means is adapted for attachment to the work implement in plural positions transversely displaced relative to the work implement, an arrangement in which the coupling means is provided with a plurality of transversely displaced portions to couple with links, and so forth. These arrangements have a disadvantage of requiring a complicated and costly construction.

SUMMARY OF THE INVENTION

This invention intends to provide a work implement mounting structure of simple construction capable of a transverse change and adjustment of the mounting position of the work implement relative to the tractor. The work implement mounting structure according to this invention comprises a pair of right and left coupling means attached to the work implement and a pair of right and left links extending from a tractor and coupled with the coupling means, characterized in that the coupling means each have a coupling portion for the work implement transversely displaced from a coupling portion for the link, and each of the coupling means is adapted for attachment in transversely reversed positions.

By arranging that the coupling means is attachable in transversely reversed positions and thus the portions of the coupling means for connection to the link are displaced in a transverse direction, the mounting position of the work implement is transversely variable in relation to the tractor. It is relatively easy to arrange the coupling means to be attachable in transversely reversed positions and to provide the coupling means with a portion for connecting with the work implement and a portion for connecting with the link transversely displaced from one another. Accordingly, this invention achieves the desired object with a simple and inexpensive construction in contrast with the foregoing known arrangement in which the coupling means is provided with a plurality of transversely alined link connecting portions or the attaching position of the coupling means is transversely variable in relation to the work implement.

An object of this invention is to provide a mounting structure capable of a multi-step change in the mounting position of the work implement relative to the tractor.

Other objects and advantages of the invention will be apparent from the following description.

BRIEF DESCRIPTION OF THE DRAWINGS

In the drawings illustrating a work implement mounting structure according to the invention.

DETAILED DESCRIPTION OF THE PREFERRED EMBODIMENTS

Figure 1:
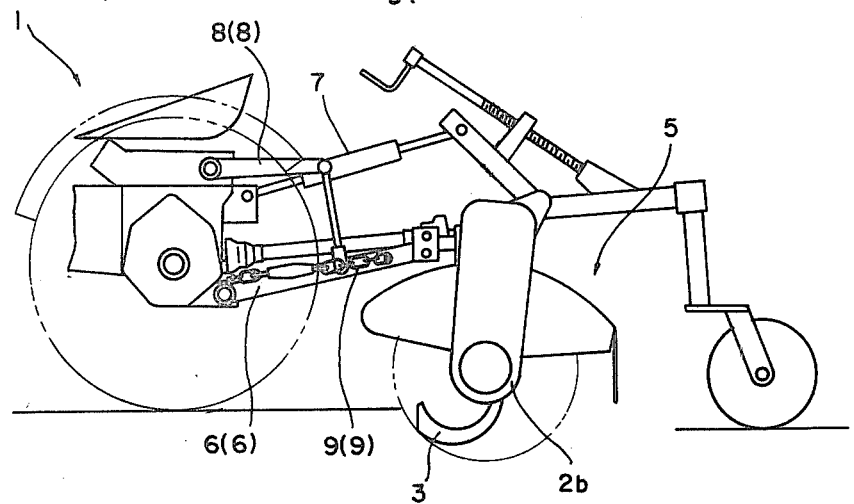
FIG. 1 is a side elevation showing a mounting structure for a plow assembly.
Figure 2:
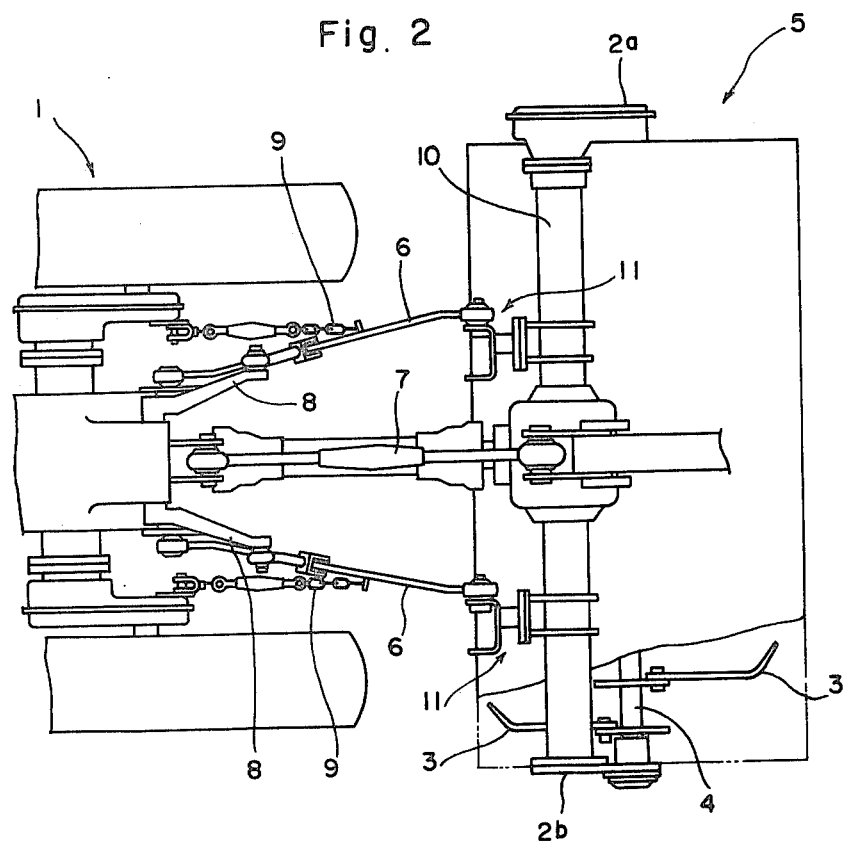
FIG. 2 is a plan view of the mounting structure of FIG. 1.

FIGS. 1 and 2 show what is known as a side drive type plow assembly 5 attached to the rear of an agricultural tractor 1. The plow assembly 5 comprises a rotary case 2a disposed on one side thereof, a side frame 2b disposed on the other side thereof, and a plow shaft 4 extending transversely between the rotary case 2a and the side frame 2b and having a plurality of projecting blades 3. How the plow assembly 5 is attached to the tractor 1 is described next.

The plow assembly 5 is connected to the tractor 1 through a three link system comprising a pair of right and left lower links 6, 6 and an upper link 7. The plow assembly 5 is raised and lowered by means of arms 8, 8 provided on the tractor 1, and is prevented from vibrating horizontally by a pulling action of a pair of chains 9, 9 mounted between the tractor 1 and the lower links 6, 6.

The lower links 6, 6 and the plow assembly 5 include an arrangement to enable the plow assembly 5 to be transversely adjusted in four positions relative to the tractor. Such arrangement is hereinafter described.

Between a top portion of the rotary case 2a and a top portion of the side frame 2b is disposed a tubular frame 10 which is also a transmission case. The tubular frame 10 carries coupling means 11, 11 of the same construction for coupling with the pair of lower links 6, 6. One of the coupling means is described with reference to FIG. 3. The coupling means 11 comprises a flange 11a adapted to couple with a flange 10a provided on the tubular frame 10, a channel member 11b disposed so as to look U-shaped in plan view, and a cylindrical intermediate member 11c connecting the flange 11a and the channel member 11b. The channel member 11b includes a pair of right and left plate portions each formed with two vertically aligned openings 12a, 12a, 12b, 12b for coupling with lower link 6. The intermediate member 11c is connected to the channel member 11b at a position displaced from the middle between the openings 12a, 12a on one side thereof and the openings 12b, 12b on the other side thereof. Thus, the coupling openings 12a, 12a, 12b, 12b are transversely displaced in relation to the flange 11a, the openings 12a, 12a on the one side being displaced nearer to the flange 11a than the openings 12b, 12b on the other side. It will be understood that the flange 11a may be coupled to the flange 10a on the plow assembly in two alternative positions by turning it by 180 degrees, and therefore that the coupling means is attachable reversedly in the transverse direction.

Figure 3:
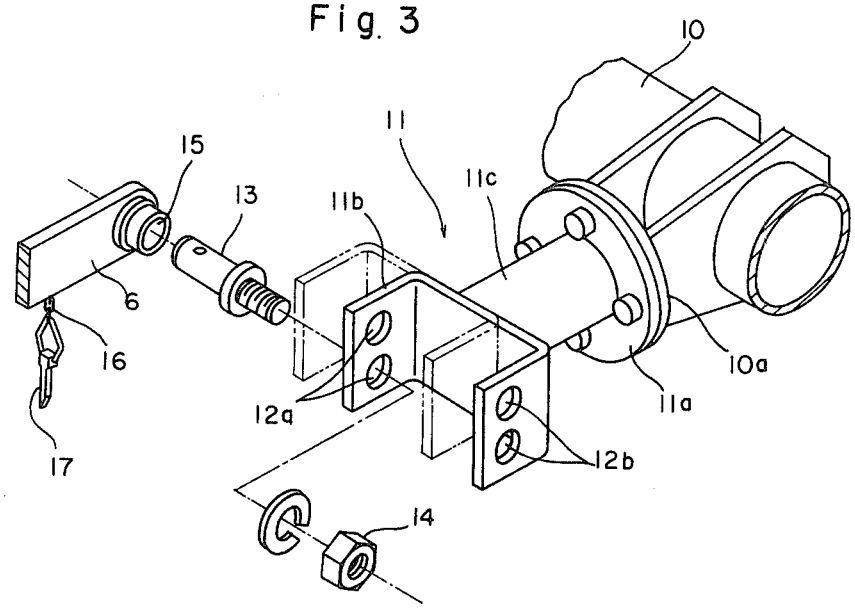
FIG. 3 is an exploded perspective view showing a coupling means.

The coupling means 11 is attached for example as shown by full lines in FIG. 3, and a connector pin 13 is fitted in one of the coupling openings 12a, 12a on the one side or one of the coupling openings 12b, 12b on the other side and securely fixed by means of a nut 14. The pin 13 thus securely fixed is passed through a receiving opening 15 defined in an end portion off the lower link 6. A protruding end of the connector pin 13 extending through the opening 15 is engaged by a stopper pin 17 which is connected to the lower link 6 through a chain 16. This is how the lower link 6 and the coupling means 11 are connected. It will be seen that, by choosing between the coupling openings 12a, 12a on the one side and the coupling openings 12b, 12b on the other side, the plow assembly 5 may be attached in two alternative positions transversely in relation to the tractor 1. Such two-step transverse positional adjustment of the plow assembly 5 in relation to the tractor is possible when the coupling means 11 is mounted in a position transversely reversed from the above described position as shown by broken lines in FIG. 3. Thus the plow assembly 5 may be mounted in four different positions altogether. According to this embodiment, the plow assembly 5 may be attached to the tractor 1 in two alternative vertical positions by choosing between the upper coupling openings and the lower coupling openings.

In working this invention, and in the foregoing embodiment for example, the coupling means 11 may include the coupling openings 12a on the one side only, for coupling with lower link 6, to provide a two-step positional adjustment. Where the four-step adjustment is provided as in the described embodiment, the openings 12a, 12b for coupling with the links may be constructed using the channel members 11b as described. Such openings 12a, 12b for coupling with the links are then relatively easy to form.

Figure 4:
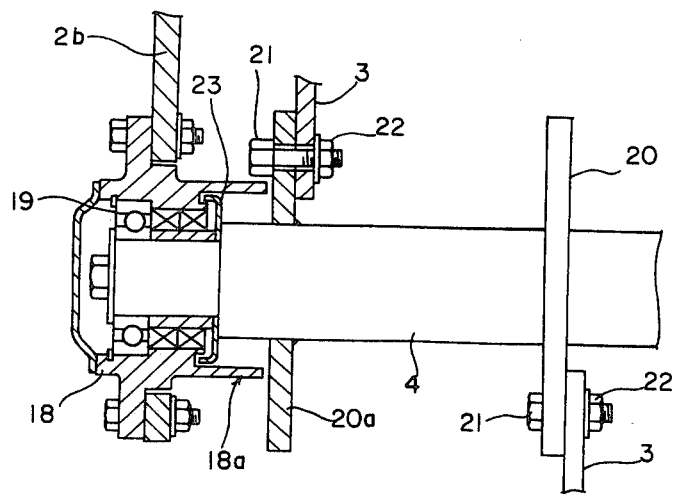
FIG. 4 is a front view in section showing a plow shaft bearing portion.

FIG. 4 shows a bearing arrangement for an end of the plow shaft 4 to be connected to the side frame 2b. The one end of the plow shaft 4 is rotatably supported via a bearing 19 by a boss 18 bolted to the side frame 2b. The plow shaft 4 carries discs 20 securely attached at suitable intervals in the axial direction. The discs 20 are provided with plowing blades 3 attached thereto by means of bolts 21 and nuts 22. The boss 18 for supporting the plow shaft 4 securely carries a disc 23 serving as protector for the bearing arrangement. The boss 18 is arranged to have an outer periphery extending to the vicinity of the side face of the disc 20 disposed next to the side frame 2b, the extending peripheral portion 18a of the boss being adjacent to the head of the blade attaching bolt 21 protruding from the disc 20a towards the boss 18. Such arrangement results in a narrow spacing between the extending portion 18a of the boss and the disc 20a, which serves to prevent entry of grass and straw bits. In addition, this arrangement enables the bolt head to scrape off the grass and straw bits to thereby prevent entry of such matter into the bearing portion in a positive manner. The above protective provision may be secured also where the plowing blade 3 is disposed between the extending portion 18a of the boss and the disc 20a, or where the plowing blade 3 is mounted by means of the nut 22 disposed adjacent to the extending portion 18a of the boss.

What I claim is:

1. A mounting structure for connecting a work implement to a tractor in four transverse positions comprising, in combination, a pair of transversely spaced right and left links extending from said tractor, a pair of right and left coupling means, each of said coupling means including a coupling member for connecting said coupling means to said work implement with said pair of coupling means in transversely spaced relationship and a coupling member for connecting said coupling means to a respective link, said coupling members on each of said coupling means being disposed in transversely displaced relationship, said coupling member for said link including a pair of transversely spaced plate portions differentially offset from said coupling member for said work implement, means for connecting said plate portions selectively to said respective link, said coupling member for said work implement being adapted to selectively connect said coupling means to said work implement in a plurality of positions to dispose said coupling member for said respective link in transversely reversed positions to thereby permit said respective link to be attached to a selected one of said plate portions by said connecting means in a selected one of four transverse positions.

2. A mounting structure in accordance with claim 1 wherein said means for connecting said plate portions to said respective link include means for connecting said respective link to a selected one of said plate portions in a selected one of two vertical positions whereby said work implement is attached to said tractor in either of two vertical positions.

3. A mounting structure in accordance with claim 1 wherein said coupling member for said link comprises a channel member of U-shaped configuration having side plates forming said plate portions.

4. A mounting structure in accordance with claim 3 wherein said means for connecting said plate portions to said respective link include a pair of vertically spaced openings in each of said side plates, each of said links having an opening adjacent the free end thereof and a connector pin arranged to be accommodated within said link opening and a selected one of said openings in a selected one of said side plates.

* * * * *